US012809157B2

(12) United States Patent
Themelis

(10) Patent No.: US 12,809,157 B2
(45) Date of Patent: Nov. 24, 2026

(54) APPARATUS FOR AN OPTICAL IMAGING SYSTEM, OPTICAL IMAGING SYSTEM, METHOD AND COMPUTER PROGRAM

(71) Applicant: Leica Instruments (Singapore) Pte. Ltd., Singapore (SG)

(72) Inventor: George Themelis, Singapore (SG)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 51 days.

(21) Appl. No.: 18/664,355

(22) Filed: May 15, 2024

(65) Prior Publication Data

US 2024/0385424 A1 Nov. 21, 2024

(30) Foreign Application Priority Data

May 16, 2023 (EP) .................................... 23173780

(51) Int. Cl.
*G02B 21/36* (2006.01)
*G02B 21/00* (2006.01)

(52) U.S. Cl.
CPC ....... *G02B 21/365* (2013.01); *G02B 21/0012* (2013.01)

(58) Field of Classification Search
CPC .............. G02B 21/365; G02B 21/0012; G02B 27/0093; A61B 2034/2055; A61B 90/20; G06N 20/00
USPC ............................................................ 348/79
See application file for complete search history.

(56) References Cited

U.S. PATENT DOCUMENTS

| | | | | |
|---|---|---|---|---|
| 11,607,287 | B2 | 3/2023 | You et al. | |
| 2005/0109960 | A1 | 5/2005 | Klein et al. | |
| 2018/0217368 | A1 * | 8/2018 | Hewlett | G02B 21/248 |
| 2018/0368656 | A1 | 12/2018 | Austin et al. | |
| 2019/0117318 | A1 * | 4/2019 | Charron | A61B 5/0077 |
| 2021/0199940 | A1 * | 7/2021 | You | A61B 90/20 |

FOREIGN PATENT DOCUMENTS

WO 2015151447 A1 10/2015

OTHER PUBLICATIONS

"Microscope and Mouthpiece", https://www.neurosurgicalatlas.com/volumes/cerebrovascular-surgery/aneurysms/microscope-and-mouthpiece (last accessed: Jun. 2, 2023).
"Performing surgery by tilts of the head: the world's first operation using 3D-RoboticScope", https://www.usz.ch/en/performing-surgery-by-tilts-of-the-head-the-worlds-first-operation-using-3d-roboticscope/, (Last updated on Apr. 13, 2021; First published on Jun. 19, 2020).

* cited by examiner

*Primary Examiner* — John W Miller
*Assistant Examiner* — Omer Khalid
(74) *Attorney, Agent, or Firm* — 2SPL Patent Attorneys PartG mbB; Yong Beom Hwang

(57) ABSTRACT

Examples relate to an apparatus for an optical imaging system. The apparatus comprises one or more processors and one or more storage devices. The apparatus is configured to obtain position data indicative of a position of the microscope of the optical imaging system relative to the user of the optical imaging system. The apparatus is further configured to determine control data for adjusting an optical path of the microscope. The control data is determined based on the position data.

12 Claims, 4 Drawing Sheets

APPARATUS FOR AN OPTICAL IMAGING SYSTEM, OPTICAL IMAGING SYSTEM, METHOD AND COMPUTER PROGRAM

TECHNICAL FIELD

Examples relate to an apparatus for an optical imaging system, such as surgical optical imaging system, to an optical imaging system, a method, and a computer program.

BACKGROUND

The alignment of an optical imaging system, e.g., a surgical optical imaging system such as an exoscope, is a critical factor for a good field of view (FOV) and a natural experience of eye-hand coordination. Several techniques are known to provide such an alignment. Head-mounted microscopes and surgical loops provide a natural and intuitive control of the magnified FOV, as the optics provide a view that is always aligned with the surgeon's natural vision, and the FOV is adjusted by turning the head, as in the natural vision. However, head-mounted microscopes add weight to the surgeon's head and also require some time and effort to be put on and take off. Moreover, the magnified FOV "moves" much faster than the natural vision, making it unnaturally sensitive to the tilt of the surgeon's head.

Augmented (AR) and mixed reality (MR) platforms provide a similarly simple and intuitive adjustment of FOV. However, AR and MR platforms typically do not offer magnification, and when they do, they have the same unnatural sensitivity to head tilt.

Surgical microscopes offer mouth-switches that allow the surgeon to keep the microscope attached to the surgeon's head, allowing the surgeon to reposition and align the microscope by moving the head. However, mouth-switches are meant for optical/analogue microscopes with eyepieces, where the surgeon needs to keep the head very close to the microscope anyway. An exoscope is typically not placed close enough to the surgeon's head, making it difficult or impossible to use a mouth switch.

Robotized surgical robots allow the surgeon to control the microscope alignment by tilting and moving the head. However, head-controlled robotized microscopes are used to change the relative position and angle but are not used to keep the microscope close to the surgeon's head. Therefore, the surgeon needs to initially position the microscope and then further control the observation angle. As a result the microscope's observation view may not be close enough to the surgeon's natural view, and thus the surgeon's eye-hand coordination is not actively maintained.

Thus, there may be a desire for an improved concept for an alignment of an optical imaging system, especially for a surgical optical imaging system comprising an exoscope.

SUMMARY

This desire is addressed by the subject-matter of the independent claims.

The concept proposed in the present disclosure is based on the insight, that an adjustment of an optical path of a microscope can be performed based on control data. The control data may be determined based on position data indicative of a position of the microscope relative to a user of an optical imaging system comprising the microscope. By determining the position of the microscope relative to the user an observation angle of the microscope can be matched to a user's viewing angle, for example. Thus, a FOV of the microscope can be matched with a FOV of the user. In this way, the user experience can be improved, e.g., providing a natural experience of eyes-hands coordination for the user. Optionally, the position data can be used to automatically position the microscope.

Examples provide an apparatus for an optical imaging system comprising one or more processors and one or more storage devices. The apparatus is configured to obtain position data indicative of a position of the microscope of the optical imaging system relative to the user of the optical imaging system. The apparatus is further configured to determine control data for adjusting an optical path of the microscope. The control data is determined based on the position data. For example, the position data may be indicative of a distance, e.g., a minimal distance, between the microscope and the user, an orientation of the microscope relative to the user and/or an orientation of the microscope relative to an orientation of the user. The position data may be indicative of the position of the microscope relative to a part of the body of the user, e.g., a head, a forehead and/or eyes. For example, the control data may be indicative of a movement of the microscope to adjust the optical path of the microscope. For example, the control data may be indicative of an arrangement of the microscope relative to the user. The control data can be used to adjust an orientation of the microscope, such like an arrangement of the microscope or a part of the microscope and/or an optical component along the optical path. Thus, determining the control data based on the position data may allow to adjust the optical path of the microscope, such that an observation angle of the microscope can be adjusted to improve a FOV of the microscope. For example, the observation angle of the microscope can be substantially matched to the viewing angle of the user. In this way, the FOV of the microscope can be substantially matched to the FOV of the user, which may increase a user's experience.

In an example, the apparatus may be configured to obtain position data by obtaining a position of the head of the user relative to the microscope, a position of eyes of the user and/or a position of a sample viewed through the microscope of the optical imaging system. By obtaining the position of the head of the user and/or the position of the eyes of the user a viewing angle and/or an orientation of the user can be determined. Thus, the control data can be determined based on the viewing angle and/or the orientation of the user. In this way, the optical path of the microscope can be adjusted to the viewing angle and/or the orientation of the user. For example, the optical path can be adjusted such that the optical path substantially match the viewing angle of the user.

In an example, the apparatus may be configured to control an arrangement of the microscope or a part of the microscope. The control may be based on the control data. For example, the apparatus may control the arrangement of the microscope or the part of the microscope by transmitting the control data to a control unit part of the microscope. The control unit may be tasked with arranging the microscope or the part of the microscope. In this case, the apparatus may trigger the arrangement of the microscope or the part of the microscope. Alternatively, the apparatus may control the arrangement of the microscope or the part of the microscope. For example, the apparatus may transmit the control data to an actuator configured to arrange the microscope. In this case, the apparatus can control the arrangement of the microscope or the part of the microscope directly.

In an example, the apparatus may be configured to control an arrangement of an optical component along the optical path of the microscope. The control may be based on the control data. The apparatus may control the arrangement of the optical component directly or may trigger the arrangement as described above with reference to the arrangement of the microscope or the part of the microscope. By arranging an optical component along the optical path of the microscope the optical path of the microscope can be adjusted using an optical component external to the microscope. In this way, the possibility of an adaptation of the optical path can be improved. For example, a lens could be arranged in the optical path to decrease a deviation between the optical path and the viewing path. The lens may be less distracting to the user than the microscope, as the lens may be smaller and/or attract less attention from the user.

In an example, the apparatus may be configured to determine viewing path data indicative of a viewing path of the user. The determination may be based on the position of the head of the user and/or the position of the eyes of the user. Further, the apparatus may be configured to determine the control data based on the viewing path data. The viewing path may be defined by the viewing angle of the user. For example, the viewing path may be the path from the eyes of the user to a sample (e.g., a patient) the user is working with. Thus, the viewing path can be determined based on the position of the sample and the position of the head of the user and/or the viewing direction (e.g., given by the viewing angle) of the user. In this way, a reliability of the control data can be increased.

In an example, the apparatus may be configured to control the adjustment of the optical path of the microscope by decreasing a deviation between the optical path of the microscope and the viewing path of the user. The control may be based on the control data. For example, decreasing the deviation between the optical path of the microscope and the viewing path of the user may result in a decreased deviation of the observation angle and the viewing angle. In an example, the apparatus may be configured to control the adjustment of the optical path of the microscope by decreasing a deviation between the observation angle of the microscope and the viewing angle of the user. In this way, a FOV of the microscope can be matched to the natural FOV of the user.

In an example, the apparatus may be configured to determine the control data based on threshold data. The threshold data is indicative of a desired distance between the head of the user and the microscope and/or an optical component along the optical path of the microscope. Using the threshold data the microscope and/or the optical component can be arranged in a certain distance to the user, e.g., the head of the user and/or the eyes. In this way, a contact between the microscope and/or the optical component and the user can be prevented. Further, an arrangement of the microscope and/or the optical component can be matched to a user's desire.

In an example, the apparatus may be configured to control the adjustment of the optical path of the microscope for complying with a desired distance. The control may be based on the threshold data. In this way, the optical path of the microscope can be adjusted in an improved way.

In an example, the apparatus may be configured to receive the threshold data from an input device. For example, the user can define the desired distance using an input device, such like a keyboard, a mouse. In this way, the user can set a desired distance for operating with the microscope of the optical imaging system.

In an example, the apparatus may be further configured to obtain user position data indicative of the position of a user of the optical imaging system relative to the sample viewed through the microscope of the optical imaging system. Further, the apparatus may be configured to determine orientation data indicative of a desired orientation of the user to view the sample and to determine the control data. The orientation data may be determined based on the user position data. The control data may be determined based on the orientation data. Determining the orientation data may allow to determine a desired orientation of the user to view the sample. This may allow the apparatus to determine a desired orientation (e.g., viewing angle, head orientation) when the user is not looking at the sample. Based on the desired orientation, the apparatus can control the adjustment of the optical path. For example, the optical path of the microscope may be controlled such that it deliberately deviate from a current orientation of the user, such that the optical path points towards the sample.

In an example, the apparatus may be configured to receive sensor data of a position sensor and to determine the position data based on the sensor data. The sensor data may be indicative of a position of the user. In this way, the apparatus can determine the position data in a facilitated way.

In an example, the position sensor may be an optical sensor an electromagnetic sensor and/or a physical first sensor. In this way, the sensor data can be measured by an appropriate sensor.

Examples provide an optical imaging system comprising an apparatus as described above.

Examples provide a method comprising obtaining position data indicative of a position of a microscope of the optical imaging system relative to a user of the optical imaging system and determining, based on the position data, control data for adjusting an optical path of the microscope.

Various examples of the present disclosure relate to a corresponding computer program with a program code for performing the above method when the computer program is executed on a processor.

SHORT DESCRIPTION OF THE FIGURES

Some examples of apparatuses and/or methods will be described in the following by way of example only, and with reference to the accompanying figures, in which FIGS. 1*a* and 1*b* show schematic diagrams of examples of an apparatus for an optical imaging system and of a corresponding microscope for an optical imaging system;

FIGS. 2*a* and 2*b* show schematic diagrams of different examples of a microscope comprising position sensors;

DETAILED DESCRIPTION

Various examples will now be described more fully with reference to the accompanying drawings in which some examples are illustrated. In the figures, the thicknesses of lines, layers and/or regions may be exaggerated for clarity.

Figure 1A:
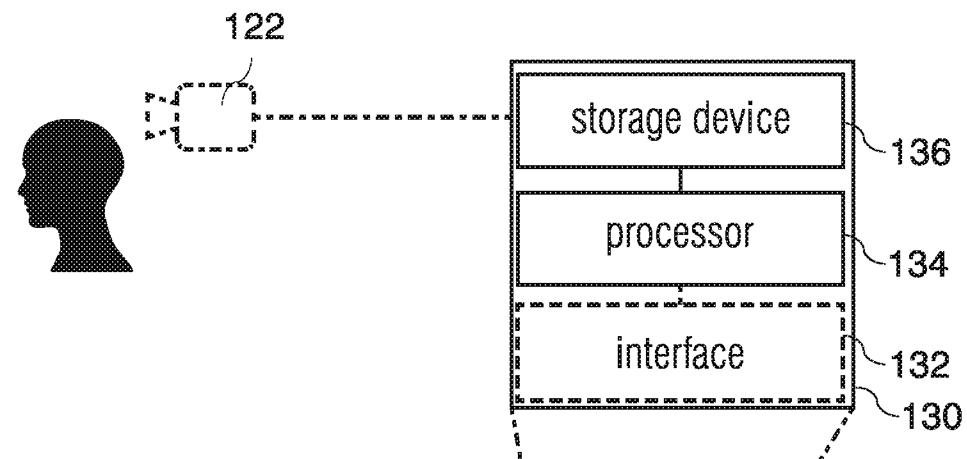
Figure 1B:
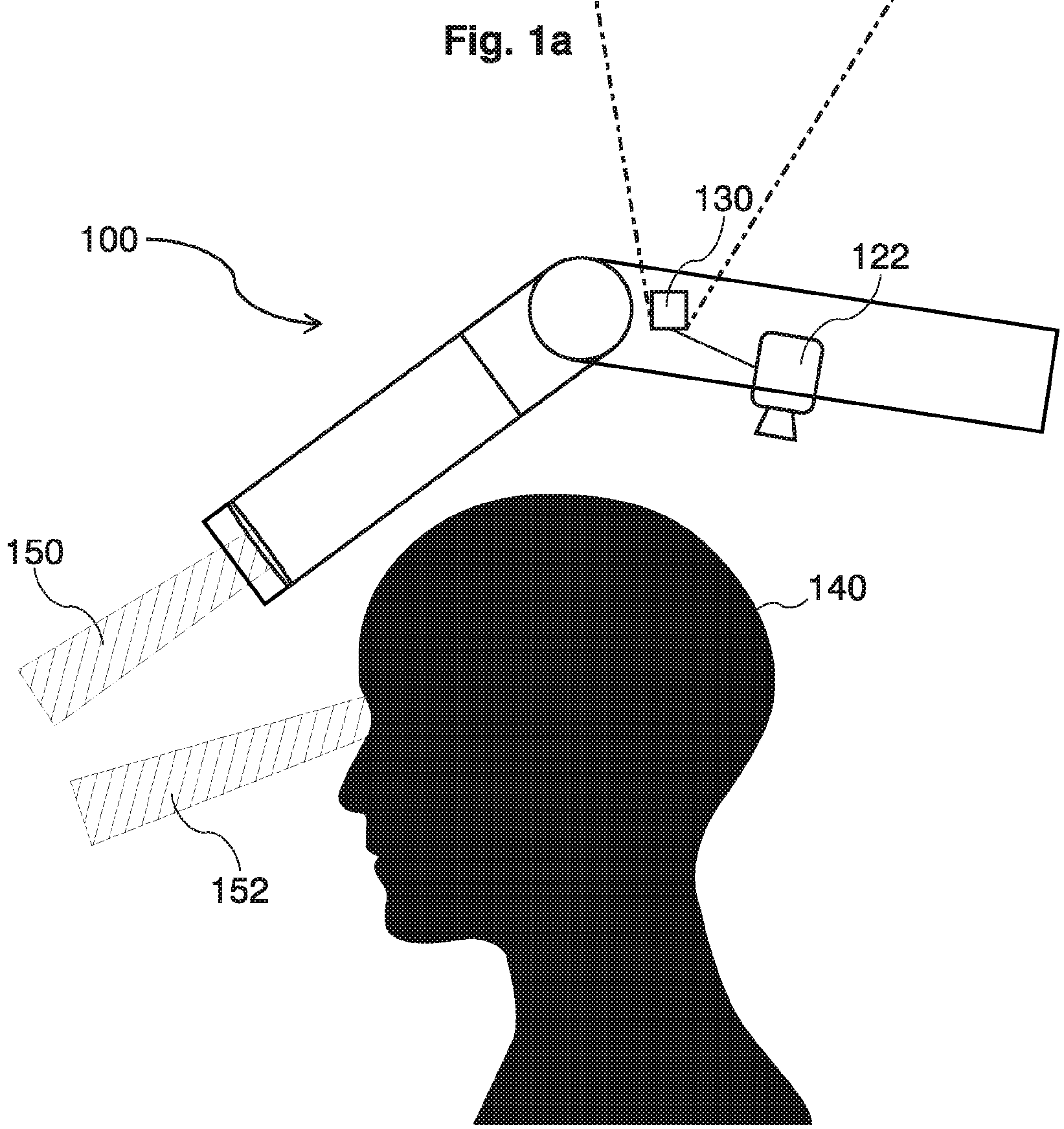

FIGS. 1*a* and 1*b* show schematic diagrams of an example of an apparatus 130 for an optical imaging system and of a corresponding microscope 100, e.g., part of an optical imaging system, comprising the apparatus 130. The apparatus 130 is tasked with controlling various aspects of the microscope 100 of the optical imaging system, which may be a surgical optical imaging system, and of the entire optical imaging system and/or with processing various types of sensor data of the optical imaging system. Consequently, the apparatus 130 may be implemented as a computer system, which interfaces with the various components of the optical imaging system, e.g., a position sensor 122.

The apparatus 130 comprises, as shown in FIG. 1*a*, one or more processors 134 and one or more storage devices 136. Optionally, the apparatus 130 further comprises one or more interfaces 132. The one or more processors 134 are coupled to the one or more storage devices 136 and to the optional one or more interfaces 132. In general, the functionality of the apparatus 130 may be provided by the one or more processors 134 (for determining the control data), in conjunction with the one or more interfaces 132 (for exchanging information, e.g., with the position sensor 122) and/or with the one or more storage devices 136 (for storing and/or retrieving information).

The apparatus 130 is configured to obtain position data indicative of a position of the microscope 100 of the optical imaging system relative to the user of the optical imaging system. For example, the apparatus 130 may obtain the position data by determining the position data based on sensor data. For example, the apparatus 130 may receive raw sensor data from the position sensor 122 and may postprocess the sensor data to determine the position data. Alternatively, the apparatus 130 may obtain the position data by receiving the position data from the position sensor 122. For example, the apparatus 130 may receive post processed sensor data providing information about the position of the microscope 100 relative to the user, such that no further processing by the apparatus may be necessary. Alternatively, the apparatus 130 may obtain the position data by measuring the position of the microscope 100 relative to the user, e.g., using the position sensor 122. For example, the apparatus 130 may comprise the position sensor 122.

Obtaining the position data may allow the apparatus 130 to determine information about a desired observation angle/optical path 150 of the microscope 100. For example, the microscope 100 may be an exoscope arranged adjacent the user to provide a magnification of a sample the user is working with. For example, the exoscope may provide a live view of the sample to be displayed on a display device. For example, a user, such like a surgeon, may use the display device to view a magnified live view of the sample, e.g., a patient. For example, the user can switch between viewing the sample directly and viewing a magnification of the sample on the display device.

However, since the user may switch between viewing the sample directly and viewing the sample on the display device, an alignment of the exoscope may be important. A user experience can be increased by aligning the exoscope with the (natural) viewing angle of the user. For example, an observation angle of the microscope 100 can be aligned with the viewing angle of the user. Thus, the FOV of the microscope can be adjusted, such that a deviation between the FOV of the microscope and the FOV of the user may be decreased. For example, the microscope 100 can provide an observation angle as close as possible to the user's (natural) viewing angle, e.g., simulating the experience of a head-mounted microscope.

To improve the alignment control data for adjusting an optical path 150 of the microscope 100 can be used, for example. The apparatus 130 is further configured to determine control data for adjusting the optical path 150 of the microscope 100. The control data is determined based on the position data. The control data may be indicative of an orientation of the microscope 100 relative to the user and/or a distance of the microscope 100 to the user. Thus, the control data can be used to arrange the microscope 100 relative to the user. The adjustment of the optical path 150 may result in a change of the observation angle of the microscope 100. Thus, adjusting the optical path 150 of the microscope 100 may allow to adjust the observation angle of the microscope 100. In this way, the observation angle of the microscope 100 can be matched to the viewing angle of the user. The microscope 100 can be arranged relative to the user, such that the observation angle of the microscope 100 may be as close as possible to the viewing angle of the user. For example, the optical path 150 of the microscope 100 can be adjusted to decrease a deviation between the optical path 150 of the microscope 100 and the viewing path 152 of the user, which may reduce a deviation between the observation angle/FOV of the microscope 100 and the viewing angle/FOV of the user.

For example, the microscope 100 may employ the position sensor 122 to determine the control data based on sensor data indicative of the position of the microscope 100 relative to the user. Based on the control data the observation angle of the microscope 100 can be adjusted as close as comfortably possible to the surgeon's eyes and/or head. For example, the design of the microscope 100 may be such that it allows the last optical element to be placed close to the surgeon's eyes, with minimal or no obstruction of the surgeon's view. In this way, the observation angle of the microscope 100 can be substantially matched to the viewing angle of the user. In this way, the user should be free to observe the display device and/or the sample, e.g., on the surgical table.

The viewing angle/observation angle may refer to the angle at which the user/microscope 100 views the sample. It may be the angle between the user's/microscope's 100 (e.g., the objective lens of the microscope 100) line of sight and a line perpendicular to the surface of the sample being observed. For example, it may be the angle at which the user/microscope 100 sees the sample (see also FIG. 2).

The viewing path 152/optical path 150 may refer to the length of the path taken by light as it travels from the sample to a detector of the microscope 100/the eyes of the user. It is the distance that light travels through a medium, such as air or glass, before it reaches its destination. The viewing path 152/optical path 150 can be affected by factors such as the refractive index of the medium, the distance between the sample and the detector/eyes, and the angle of incidence of the light (see also FIG. 2).

In principle, the viewing path 152 of the user may be defined by the viewing angle. The viewing path 152 of the user may be a straight path between the user's eyes and the sample. For example, as shown in FIG. 1*b* or FIG. 2, the optical path 150 may comprise a straight line between the objective lens of the microscope 100 and the sample, when no optical component external to the microscope 100 is arranged along the optical path 150.

The apparatus 130 can be used to detect the surgeon's head and/or eyes, and to position the microscope 100 as close as possible to the user's head and/or eyes to achieve an observation angle as close as comfortably close to the surgeon's observation angle. The positioning of the microscope 100 can be performed automatically by the apparatus 130. In this way, the microscope 100 can be positioned during a usage, e.g., an operation, such that the observation angle of the microscope 100 may be matched to the viewing angle of the user without contact between microscope 100/optical component and the user. Thus, the FOV of the microscope can be automatically adjusted to match (as good as possible) the FOV of the user.

The proposed concept may be built around two main components—the microscope 100, which comprises the optical components, and the apparatus 130, which may be used to control the microscope 100, process sensor data, e.g., of the position sensor 122, and/or to generate the control data.

In general, a microscope 100, such as the exoscope 100, is an optical instrument that is suitable for examining objects that are too small to be examined by the human eye (alone). For example, an exoscope 100 may provide an optical magnification of a sample, such as a patient during an operation. In modern microscopes 100, the optical magnification is often provided for a camera or an imaging sensor. The exoscope 100 may further comprise one or more optical magnification components that are used to magnify a view of the sample, such as an objective lens.

There are a variety of different types of optical imaging systems. If the optical imaging system 100 is used in the medical or biological fields, the sample may be a sample of organic tissue, e.g., arranged within a petri dish or present in a part of a body of a patient. In some examples of the present disclosure, e.g., as shown in FIG. 1*b*, the microscope 100 may be an exoscope 100 of a surgical optical imaging system, e.g., an optical imaging system that is to be used during a surgical procedure. However, the proposed concept may also be applied to other types of microscopy, e.g., microscopy in a laboratory or microscopy for the purpose of material inspection.

As is evident, the optical imaging system comprises a microscope 100 and a number of components, such as the apparatus 130 and the position sensor 122.

In an example, the apparatus 130 may be configured to obtain position data by obtaining a position of the head of the user 140 relative to the microscope 100, position of eyes of the user and/or a position of a sample viewed through the microscope of the optical imaging system. The position data may be obtained by receiving sensor data from the position sensor 122. The sensor data may be indicative of the position of the head of the user 140 relative to the microscope 100, the position of the eyes of the user and/or the position of the sample. Alternatively, the apparatus 130 may obtain the position data from measuring, e.g., by controlling the position sensor 122. For example, the position sensor 122 may be part of the apparatus 130.

Optionally or alternatively, if the position data is indicative of the position of the sample, the position of the sample can be determined based on the working distance of the microscope 100. For example, the position of the sample can be determined by measuring the distance of the sample from the working distance along the optical axis of the microscope 100.

For example, the axis of the microscope can be locked to a point on the sample. Thus, the microscope 100 can be operated in a follow mode. The follow mode in an exoscope may ensure that the optical axis remains aligned with the sample, even when the sample or the exoscope itself is in motion. This means that the movement of the exoscope can be detected and synchronized to maintain continuous and accurate observation of the sample. The follow mode may allow the user to track the sample while maintaining a stable alignment of the exoscope, regardless of how the sample or exoscope moves.

Two factors may determine an angle of view of a person: a head or facial orientation (i.e., face pose or face direction) and eye orientation (i.e., eye gaze direction or angle of view). The head orientation can be used to determine a global direction of the gaze. The eye orientation can be used to determine a local direction of the gaze, i.e., the angle of view. When a head of the person is level and he or she looks straight ahead, then the line of sight of the eye gaze and the facial orientation are straight ahead with 0° azimuth and 0° elevation and 0° tilt. This head position can also be described as a neutral head orientation position.

The position of the eyes of the user, e.g., an angle of view of the user, may be used by the apparatus 130 to determine the control data. For example, the angle of view of the user may indicate the viewing angle of the user or may be identical, which could be used to determine the control data. In this way, control data indicative of an arrangement of the microscope 100 can be generated by the apparatus 130 based on an actual angle of view of the user.

The position of the head of the user 140, e.g., an orientation of the head, relative to the microscope 100 can be used by the apparatus 130 to determine the control data. For example, the orientation of the head may be indicative of the viewing angle of the user, which could be used to determine the control data.

Obtaining the position data by obtaining the position of the head of the user 140 relative to the microscope 100 and/or the position of the eyes of the user may allow to increase a reliability of the determination of the control data.

In an example, the apparatus 130 may be configured to control an arrangement of the microscope 100 or a part of the microscope 100. The control may be based on the control data. As described above the apparatus 130 may control or may trigger the arrangement of the microscope 100 or the part of the microscope 100. Controlling or triggering the arrangement of the microscope 100 or the part of the microscope 100 may allow to reduce a deviation between the observation angle of the microscope 100 and the viewing angle of the user. In this way, the FOV of the microscope 100 can be adjusted such that a deviation between the FOV of the microscope 100 and the FOV of the user may be decreased. Optionally, the deviation may be reduced for a microscope working in a follow mode, such that the microscope 100 is locked to a point on the sample during reducing the deviation.

In an example, the apparatus 130 may be configured to control an arrangement of an optical component along the optical path 150 of the microscope 100. The control may be based on the control data. As described above the apparatus 130 may control or may trigger the arrangement of the optical component along the optical path 150. Controlling or triggering the arrangement of the optical component may allow to reduce a deviation between the observation angle of the microscope 100 and the viewing angle of the user. For example, the optical component may be external to the microscope 100. The optical component can be arranged in proximity to the head of the user 140, especially to the eyes of the user. The optical component may be the part along the optical path 150 of the microscope 100 closest to the user. In this way, the optical component can be utilized to improve a match between the observation angle of the microscope 100 and the viewing angle of the user.

In an example, the apparatus 130 may be configured to determine viewing path data indicative of a viewing path 152 of the user. The determination may be based on the position of the head of the user 140 and/or the position of the eyes of the user. Further, the apparatus 130 may be configured to determine the control data based on the viewing path data. The viewing path data can be used to determine an optical path 150 of the microscope 100. For example, the viewing path data may be a reference for the optical path 150 of the microscope 100 to be adjusted. The optical path 150 of the microscope 100 can be adjusted such that a deviation between the viewing path 152 and the optical path 150 of the microscope 100 may be reduced.

The viewing path 152 can be determined based on an orientation of the head of the user 140, an angle of view of the eyes of the user and/or a position of the head of the user 140 relative to the sample, for example.

In an example, the apparatus 130 may be configured to control the adjustment of the optical path 150 of the microscope 100 by decreasing a deviation between the optical path 150 of the microscope 100 and the viewing path 152 of the user. The control may be based on the control data. In this way, the optical path 150 can be substantially matched to the viewing path 152 of the user. Using the viewing path 152 of the user as reference for the adjustment of the optical path 150 of the microscope 100, may allow to match the observation angle of the microscope 100 to a desired user's viewing angle in an improved way.

In an example, the apparatus 130 may be configured to determine the control data based on threshold data. The threshold data may be indicative of a desired distance between the head of the user 140 and the microscope 100 and/or an optical component along the optical path 150 of the microscope 100. Using the threshold data may allow the apparatus 130 to adjust the optical path 150 of the microscope 100 such that the user is not or less disturbed by the microscope 100 and/or an optical component along the optical path 150 of the microscope 100. In this way, the adjustment of the optical path 150 can be performed without or reducing disturbance the user.

In an example, the apparatus 130 may be configured to control the adjustment of the optical path 150 of the microscope 100 for complying with a desired distance. The control may be based on the threshold data. In this way, the optical path 150 of the microscope 100 can be adjusted in an improved way.

In an example, the apparatus 130 may be configured to receive the threshold data from an input device. For example, the user can define the desired distance/orientation using an input device, such like a keyboard, a mouse. The input device may transmit an input signal indicative of a selection of the user of the desired distance/orientation to the apparatus 130. Thus the apparatus 130 can receive data about the desired distance/orientation of the user.

Based on the threshold data the apparatus 130 can set a threshold for adjusting the optical path 150 of the microscope 100. Thus, an arrangement of the microscope 100 can depend on the setting of the user. The trade-off between observation angle approximation and comfort (distance between microscope 100 and user) is subjective. In this way, the user can adjust a minimum microscope-head distance, for example.

In an example, the apparatus 130 may be further configured to obtain user position data indicative of the position of a user of the optical imaging system relative to the sample viewed through the microscope 100 of the optical imaging system. Further, the apparatus 130 may be configured to determine orientation data indicative of a desired orientation of the user to view the sample and to determine the control data. The orientation data may be determined based on the user position data. The control data may be determined based on the orientation data. The user position data can be used to determine a possible viewing angle of the user to view the sample.

For example, the user may not be looking at the sample because the user is moving relative to the sample to change its position to better reach the sample. In this case, the microscope 100 may not be aligned to match the actual angle of view of the user. Instead the microscope 100 can be aligned to match a desired viewing angle of the user, e.g., a viewing angle at which the user would view the sample from its current position. Thus, the adjustment of the optical path 150 can be performed based on a desired orientation of the user. In this way, even if the user is not looking at the sample, the microscope 100 can be orientated such that a desired viewing angle of the user may be matched by the observation angle of the microscope 100.

In an example, the apparatus 130 may be configured to receive sensor data of a position sensor 122 and to determine the position data based on the sensor data. The sensor data may be indicative of a position of the user. In this way, the apparatus 130 can determine the position data in a facilitated way. As described above, the apparatus may receive raw data from the position sensor 122 and may post process the raw data to determine the position of the microscope 100 relative to the user. In an example, the position sensor 122 may be an optical sensor an electromagnetic sensor and/or a physical first sensor (see FIG. 2). In this way, the sensor data can be measured by an appropriate position sensor 122. The optical sensor may be a camera. The position sensor 122 may be an ultrasound sensor. The electromagnetic sensor may be a radio-frequency identification sensor.

The apparatus 130 may provide an improved observation angle, since the microscope 100 may provide an observation angle closer to the user viewing angle. The apparatus 130 may provide a smart alignment. The alignment can be performed automatically without the need of the user's intervention. The apparatus 130 may provide a fast alignment. The alignment of the microscope 100 can be done much faster than it can be done manually. The apparatus 130 can provide a real time alignment. The adaptation of the microscope's 100 alignment can be performed continuously, so that the user can forget about the alignment aspect. The apparatus 130 can provide an ergonomic solution. The design of the microscope 100 can be such that it may reduce or minimize the obstruction of the surgeon's natural viewing angle by any part along the optical path 150 of the microscope 100.

FIG. 1*b* shows a schematic diagram of an example of a microscope 100 comprising the apparatus 130. The microscope 100 may be part of an optical imaging system. In general, a (surgical) optical imaging system is a system that comprises a microscope 100 and additional components, which are operated together with the microscope 100. In other words, a (surgical) optical imaging system is a system that comprises the microscope 100 and one or more additional components, such as the apparatus 130 (which may be a computer system being adapted to control the microscope and, for example, generate the control data), an illumination system (which is used to illuminate a sample being imaged by the microscope 120), additional sensors, displays etc.

As shown in FIG. 1*a* the optional one or more interfaces 132 is coupled to the respective one or more processors 134 at the apparatus 130. In examples the one or more processors 134 may be implemented using one or more processing units, one or more processing devices, any means for processing, such as a processor, a computer or a programmable hardware component being operable with accordingly adapted software. Similar, the described functions of the one or more processors 134 may as well be implemented in software, which is then executed on one or more programmable hardware components. Such hardware components may comprise a general-purpose processor, a Digital Signal Processor (DSP), a micro-controller, etc. The one or more processors 134 is capable of controlling the one or more interfaces 132, so that any data transfer that occurs over the one or more interfaces 132 and/or any interaction in which the one or more interfaces 132 may be involved may be controlled by the one or more processors 134.

In an embodiment the apparatus 130 may comprise a memory, e.g., the one or more storage devices 136 and at least one or more processors 134 operably coupled to the memory and configured to perform the method described below.

In examples the one or more interfaces 132 may correspond to any means for obtaining, receiving, transmitting or providing analog or digital signals or information, e.g., any connector, contact, pin, register, input port, output port, conductor, lane, etc. which allows providing or obtaining a signal or information. The one or more interfaces 132 may be wireless or wireline and it may be configured to communicate, e.g., transmit or receive signals, information with further internal or external components.

The apparatus 130 may be a computer, processor, control unit, (field) programmable logic array ((F)PLA), (field) programmable gate array ((F)PGA), graphics processor unit (GPU), application-specific integrated circuit (ASICs), integrated circuits (IC) or system-on-a-chip (SoCs) system. The apparatus 130 may be part of the microscope 100. Alternatively, the apparatus 130 may be external to the microscope 100 and may communicate with the microscope, e.g., a control unit of the microscope 100.

More details and aspects are mentioned in connection with the examples described below. The example shown in FIG. 1 may comprise one or more optional additional features corresponding to one or more aspects mentioned in connection with the proposed concept or one or more examples described below (e.g., FIGS. 2-4).

Figure 2A:
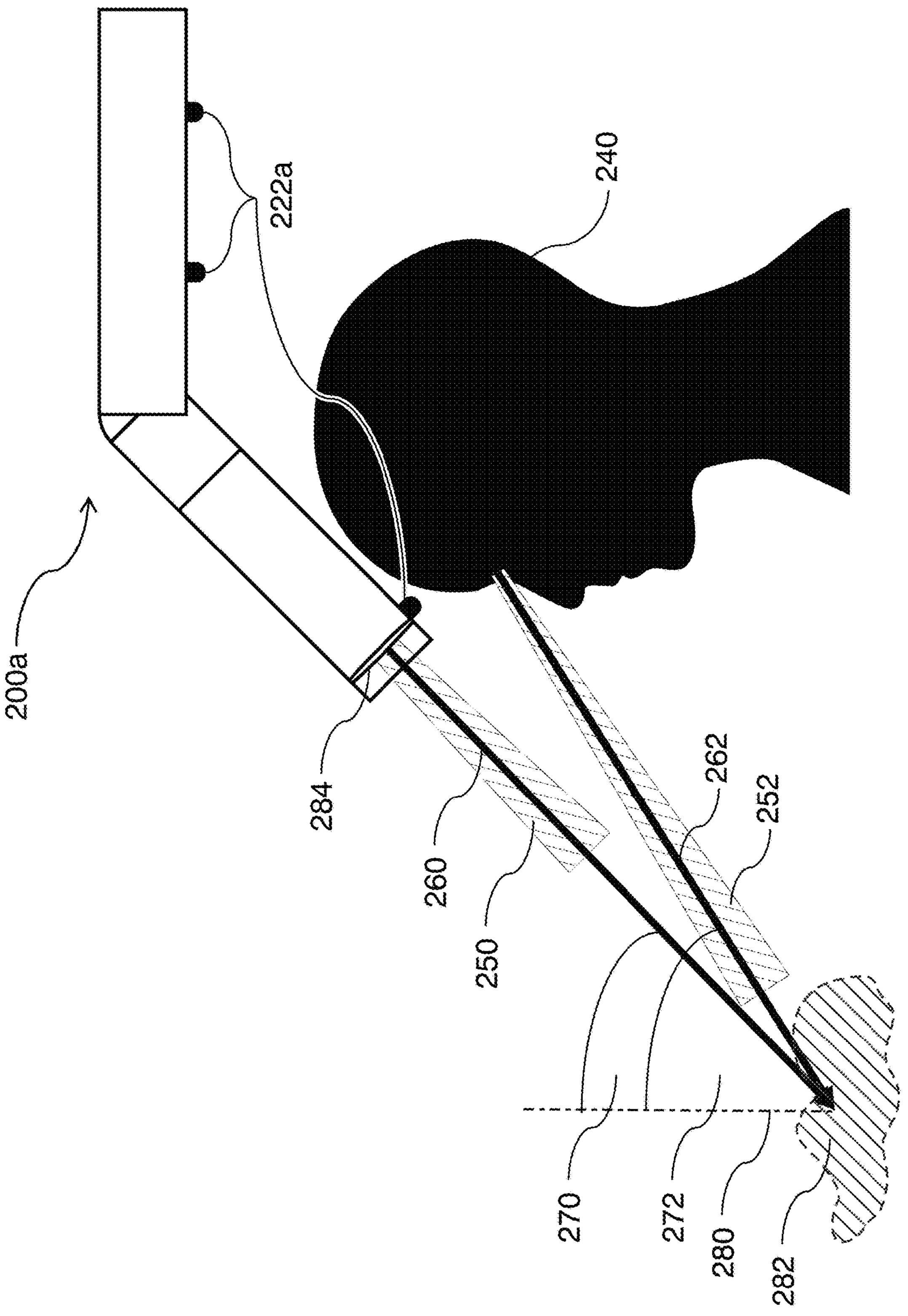
Figure 2B:
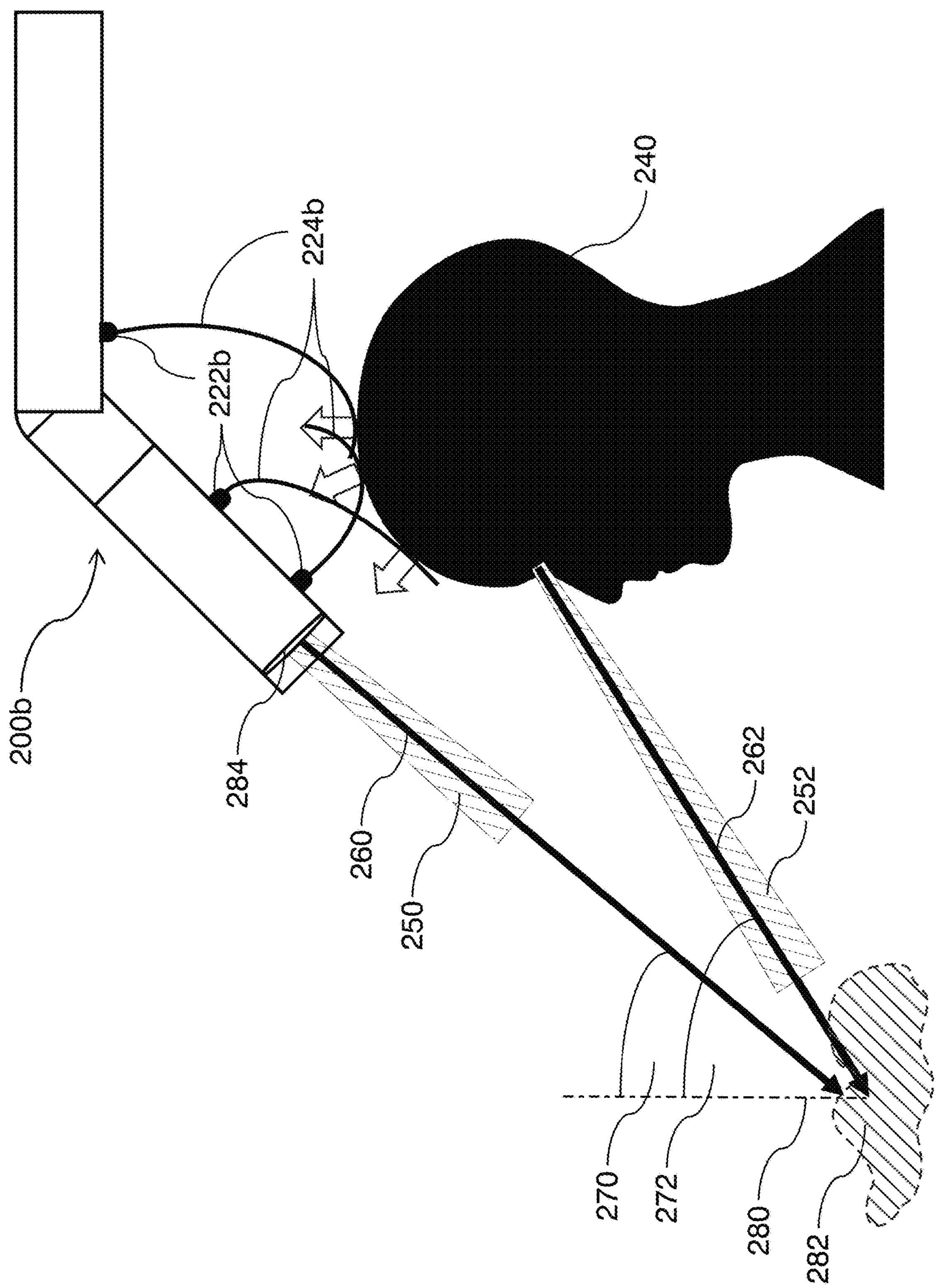

FIGS. 2*a* and 2*b* show schematic diagrams of different examples of a microscope 200*a*, 200*b* comprising position sensors 222*a*, 222*b*. FIG. 2*a* shows a microscope 200*a* with three different non-physically contacting position sensors 222*a*, e.g., cameras, ultrasound sensors, and/or electromagnetic sensors. The observation angle 270 of the microscope 200*a* may be defined by the angle between line of sight 260 of the microscope 200*a*, e.g., the objective lens 284 of the microscope 200*a*, and a line 280 perpendicular to the surface of the sample 282 being observed. The viewing angle 272 of the head of user 240 may be defined by the angle between line of sight 262 of the eyes of the head of user 240 and the line 280 perpendicular to the surface of the sample 282 being observed.

In principle, the viewing path 252 may overlap with the line of sight 262 of the head of user 240. When the viewing angle 272 changes, the line of sight 262 of the head of user 240 changes and consequently the viewing path 252.

The optical path 250 may partially overlap with the line of sight 260 of the microscope 200*a*. The optical path 250 outside the microscope 200*a* may overlap with the line of sight 260 of the microscope 200*a* when no external optical component is arranged along the optical path 250. The optical path 250 outside the microscope 200*a* may be at least partially different from the line of sight 260 of the microscope if an optical component is arranged along the optical path. However, by adjusting the optical path 250 of the microscope 200*a* a deviation between the viewing angle 272 and the observation angle 270 can be reduced. When no optical element is arranged along the optical path 250, the deviation between viewing angle 272 and observation angle 270 can be reduced by reducing the deviation between the optical path 250 and the viewing path 252 straightforward.

FIG. 2*b* shows a microscope 200*b* with three physical force sensors 222*b*. The physical force sensors 222*b* physically contact the head of user 240. For example, small blades 224*b*, e.g., made of plastic or metal, could be activated when touched by the head of the user 240. A lateral dimension, e.g., a diameter or a width, of a blade may be at least 3 mm, or at least 4 mm, or at least 5 mm and/or at most 7 mm or at most 6 mm. The shape of the blade may be tubular or flat. In this way, an improved concept for obtaining the position data can be provided. The physical force sensors 222*b* may be force/torque sensors. A blade 224*b*, e.g., a flexible and/or lightweight blade, may be attached to each physical force sensors 222*b*. Each blade 224*b* may physically contact the head of user 240. Thus, the blades 224*b* can sense the movement of the head of user 240.

More details and aspects are mentioned in connection with the examples described above and/or below. The example shown in FIG. 2 may comprise one or more optional additional features corresponding to one or more aspects mentioned in connection with the proposed concept or one or more examples described above (e.g., FIG. 1) and/or below (e.g., FIGS. 3-4).

Figure 3:
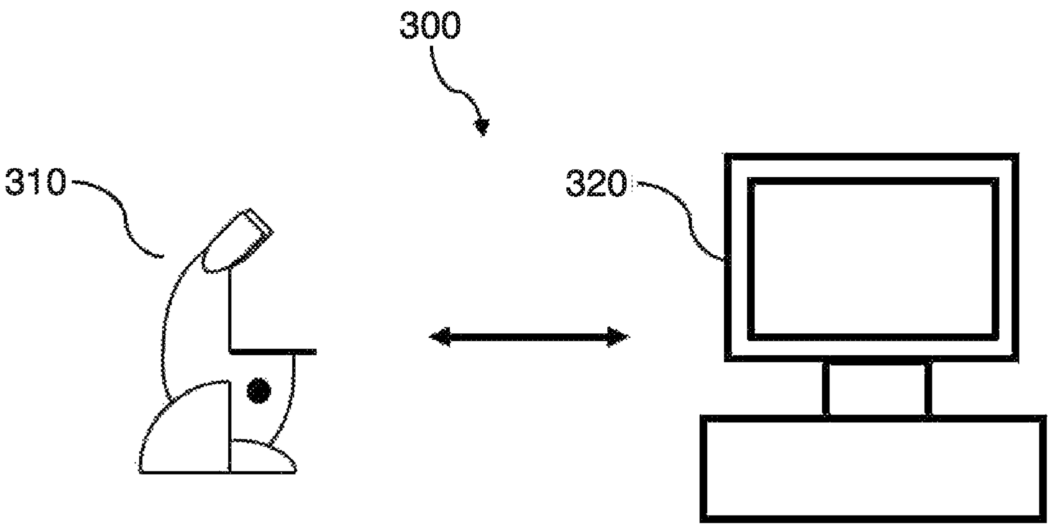
FIG. 3 shows a schematic illustration of a system.

FIG. 3 shows a schematic illustration of a system 300, e.g., an optical imaging system 300. The optical imaging system 300 may comprise an apparatus as described with reference to FIG. 1 and a microscope 310 as described with reference to FIG. 1 or FIG. 2. For example, the microscope 310 may comprise or can be communicatively coupled to the apparatus. Alternatively, the computer system 320 may comprise the apparatus.

Figure 4:
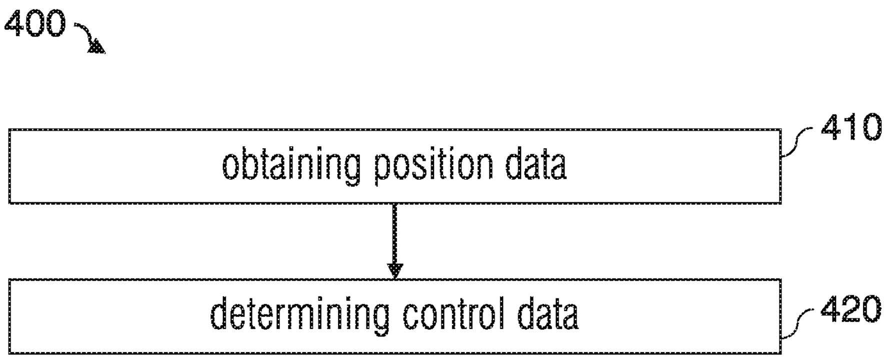
FIG. 4 shows a flow chart of an example of a method for an optical imaging system.

FIG. 3 shows a schematic illustration of a system 300, e.g., an optical imaging system, configured to perform a method described herein, e.g., with reference to FIG. 4. The system 300 comprises a microscope 310 and a computer system 320. The microscope 310 may comprise the apparatus as described above, e.g., with reference to FIG. 1. The microscope 310 may be a microscope as described with reference to FIG. 1 or FIG. 2. The microscope 310 is configured to take images and is connected to the computer system 320. The computer system 320 is configured to execute at least a part of a method described herein. The computer system 320 may be configured to execute a machine learning algorithm. The computer system 320 and the microscope 310 may be separate entities but can also be integrated together in one common housing. The computer system 320 may be part of a central processing system of the microscope 310 and/or the computer system 320 may be part of a subcomponent of the microscope 310, such as a sensor, an actor, a camera or an illumination unit, etc. of the microscope 310.

The computer system 320 may be a local computer device (e.g., personal computer, laptop, tablet computer or mobile phone) with one or more processors and one or more storage devices or may be a distributed computer system (e.g., a cloud computing system with one or more processors and one or more storage devices distributed at various locations, for example, at a local client and/or one or more remote server farms and/or data centers). The computer system 320 may comprise any circuit or combination of circuits. In one embodiment, the computer system 320 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g., camera) or any other type of processor or processing circuit. Other types of circuits that may be included in the computer system 320 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 320 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 320 may also include a display device, one or more speakers, and a keyboard and/or controller, which can include a mouse, trackball, touch screen, voice-recognition device, or any other device that permits a system user to input information into and receive information from the computer system 320.

More details and aspects are mentioned in connection with the examples described above and/or below. The example shown in FIG. 3 may comprise one or more optional additional features corresponding to one or more aspects mentioned in connection with the proposed concept or one or more examples described above (e.g., FIGS. 1-2) and/or below (e.g., FIG. 4).

FIG. 4 shows a flow chart of an example of a method 400 for an optical imaging system. The method 400 comprises obtaining 410 position data indicative of a position of a microscope of the optical imaging system relative to a user of the optical imaging system and determining 420, based on the position data, control data for adjusting an optical path of the microscope. The method 400 may be performed by an apparatus as described above, e.g., with reference to FIG. 1.

More details and aspects are mentioned in connection with the examples described above. The example shown in FIG. 3 may comprise one or more optional additional features corresponding to one or more aspects mentioned in connection with the proposed concept or one or more examples described above (e.g., FIGS. 1-4).

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

If some aspects have been described in relation to a device or system, these aspects should also be understood as a description of the corresponding method and vice versa. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The aspects and features described in relation to a particular one of the previous examples may also be combined with one or more of the further examples to replace an identical or similar feature of that further example or to additionally introduce the features into the further example.

LIST OF REFERENCE SIGNS

100 microscope
105 base
110 sample
122 position sensor
130 apparatus
132 interface
134 processor
136 storage device
140 head of the user
200*a*, 200*b* microscope
222*a*, 222*b* position sensor
224*b* blade
240 head of the user
250 optical path
252 viewing path
260 line of sight
262 line of sight
270 observation angle
272 viewing angle
280 line perpendicular to a surface of the sample
282 sample
284 objective lens
300 system
310 microscope
320 computer system
400 method for an optical imaging system
410 obtaining position data
420 determining control data

The invention claimed is:

1. An apparatus for an optical imaging system, comprising one or more processors and one or more storage devices, wherein the apparatus is configured to:

obtain position data indicative of a position of a microscope of the optical imaging system relative to a user of the optical imaging system;

determine direction data indicative of a line-of-sight direction of the user to a sample;

determine, based on the position data and the direction data, control data for adjusting an optical path of the microscope such that the optical path of the microscope and the line of-sight direction of the user to the sample are substantially colinear to reduce an angular deviation between the optical path of the microscope and the line-of-sight direction of the user to the sample, such that an image captured along the optical path corresponds to a view of the sample as perceived by the user along the line-of-sight direction, wherein the apparatus is configured to obtain the position data by obtaining at least one of a position of a head of the user relative to the microscope, a position of eyes of the user or a position of a sample viewed through the microscope of the optical imaging system, wherein the apparatus is configured to determine, based on at least one of the position of the head of the user or the position of the eyes of the user, the direction data, wherein the apparatus is configured to control, based on the control data, the adjustment of the optical path of the microscope for decreasing a deviation between the optical path of the microscope and the line-of-sight direction of the user to the sample.

2. The apparatus according to claim 1, wherein the apparatus is configured to: control, based on the control data, an arrangement of the microscope or a part of the microscope.

3. The apparatus of claim 1, wherein the apparatus is configured to: control, based on the control data, an arrangement of an optical component along the optical path of the microscope.

4. The apparatus according to claim 1, wherein the apparatus is configured to: determine, based on threshold data, the control data, the threshold data indicative of a desired distance between the head of the user and at least one of the microscope or an optical component along the optical path of the microscope.

5. The apparatus according to claim 4, wherein the apparatus is configured to: control, based on the threshold data, the adjustment of the optical path of the microscope for complying with the desired distance.

6. The apparatus according to claim 4, wherein the apparatus is configured to: receive the threshold data from an input device.

7. The apparatus according to claim 1, wherein the apparatus is configured to: obtain user position data indicative of a position of the user of the optical imaging system relative to the sample viewed through the microscope of the optical imaging system; determine, based on the user position data, orientation data indicative of a desired orientation of the user to view the sample; and determine, based on the orientation data, the control data.

8. The apparatus according to claim 1, wherein the apparatus is configured to: receive sensor data of a position sensor, the sensor data indicative of a position of the user relative to the microscope; and determine, based on the sensor data, the position data.

9. The apparatus according to claim 8, wherein the position sensor is at least one of an optical sensor, an electromagnetic sensor or a physical force sensor.

10. An optical imaging system, comprising: the apparatus according to claim 1.

11. A method, comprising:

obtaining position data indicative of a position of a microscope of the optical imaging system relative to a user of the optical imaging system;

determining direction data indicative of a line-of-sight direction of the user to a sample; and determining, based on the position data and the direction data, control data for adjusting an optical path of the microscope-such that the optical path of the microscope and the line of sight direction of the user to the sample are substantially colinear to reduce an angular deviation between the optical path of the microscope and the line-of-sight direction of the user to the sample, such that an image captured along the optical path corresponds to a view of the sample as perceived by the user along the line-of-sight direction, wherein the position data is obtained by obtaining at least one of a position of a head of the user relative to the microscope, a position of eyes of the user or a position of a sample viewed through the microscope of the optical imaging system, wherein the direction data is determined based on at least one of the position of the head of the user or the position of the eyes of the user, wherein the adjustment of the optical path of the microscope is controlled based on the control data for decreasing a deviation between the optical path of the microscope and the line-of-sight direction of the user to the sample.

12. A non-transitory computer readable medium including a program code for performing the method according to claim 11 when executed on a processor.

* * * * *